UNITED STATES PATENT OFFICE.

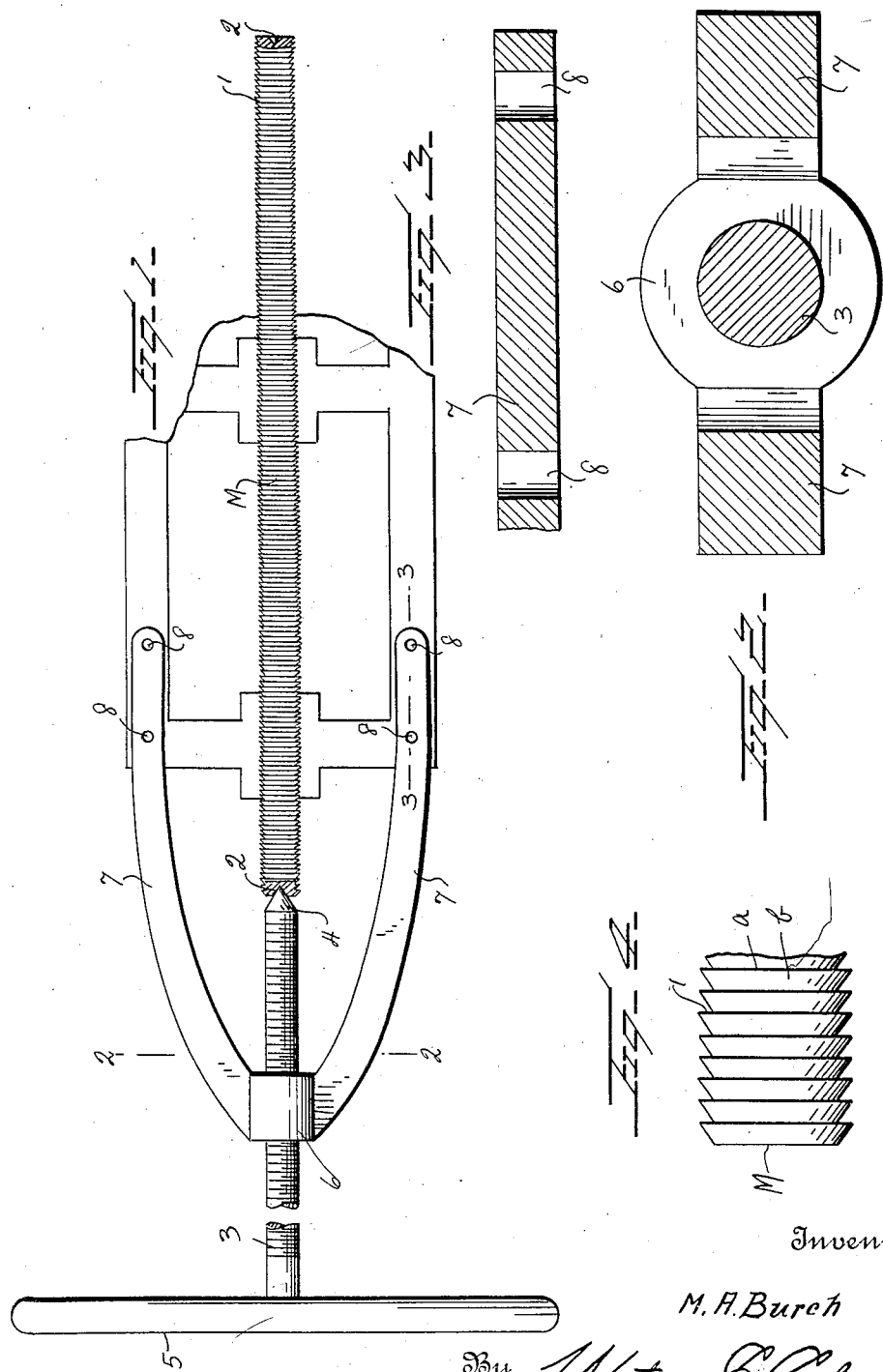

MASTON A. BURCH, OF CASS, INDIANA.

BEARING-SCRAPER.

1,336,885.    Specification of Letters Patent.    Patented Apr. 13, 1920.

Application filed May 5, 1919. Serial No. 294,982.

*To all whom it may concern:*

Be it known that I, MASTON A. BURCH, a citizen of the United States, residing at Cass, in the county of Sullivan and State of Indiana, have invented certain new and useful Improvements in Bearing-Scrapers, of which the following is a specification, reference being had to the accompanying drawings.

This invention relates to certain improvements in bearing scrapers and has relation more particularly to a device of this general character especially designed and adapted for use in connection with babbitt or bronze bearings for the crank shaft of an internal combustion engine, and it is an object of the invention to provide a novel and improved device of this general character including a scraper member, together with means adapted for detachable connection with the fly wheel end of the engine block or other support for forcing the scraper through the bearing or bearings.

The invention consists in the details of construction and in the combination and arrangement of the several parts of my improved bearing scraper whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in top plan of a scraper constructed in accordance with an embodiment of my invention.

Fig. 2 is a sectional view taken substantially on the line 2—2 of Fig. 1.

Fig. 3 is a view taken substantially on the line 3—3 of Fig. 1, and

Fig. 4 is an enlarged fragmentary view in elevation of the scraping tool as herein embodied.

As disclosed in the accompanying drawings, M denotes a scraping member of desired dimensions and which is cylindrical in form and provided throughout its length with a series of annular cutting teeth 1. As is particularly illustrated in Fig. 4, a face $a$ of each of the teeth 1 is flat, while the opposite face $b$ is disposed on a predetermined bevel or incline toward the body of the member M. The opposite ends of the member M are provided with the centering recesses 2.

My improved device is particularly adapted to scrape the bearings of babbitt or the like for the crank shaft of the motor, and this is accomplished by forcing the member M through said bearings after the engine has been arranged by the mechanic in a manner to permit this operation. In forcing the member M through a bearing, the flat faces $a$ of the teeth 1 are disposed toward the work so that the desired scraping or cutting action is assured.

In order to properly force the member M through the work, the presser rod 3 is employed having one end portion 4 conical in order to seat within a center recess 2 while the opposite end portion of the rod or bar 3 is provided with a wheel 5 or the like for imparting the requisite rotation to said rod or bar 3.

The rod or bar 3 is threaded through a block 6 and integrally formed with opposed faces of the block 6 are the elongated curved arms 7 disposed in a direction away from the wheel 5 and the free or outer end portions of said arms 7 are adapted to be suitably engaged with the fly wheel end portion of the engine block.

Each of the arms 7 is provided in its free or outer end portion with a pair of longitudinally spaced openings 8 to afford means whereby said arm may be properly engaged with the engine block. In practice, it is preferred that a bolt coact with the inner opening 8 while a dowel pin is employed in connection with the outer opening.

The device as herein disclosed is constructed for use particularly with the engine of the Ford automobile, although it is to be understood that the parts may be arranged in a manner to permit the use of the device in connection with any type of internal combustion engine.

It is preferred that the member M be constructed of cold rolled steel, case hardened and ground, with the points of adjacent teeth 1 spaced apart about three-sixteenths of an inch. The major diameter of the member M will be in accordance with the desired diameter of the bearing. It is also preferred that the member M be substantially twenty-eight inches in length so that the same may be employed with facility in connection with all of the bearings for the crank shaft of the engine.

When the block 6 is in applied position, the rod or bar 3 is in proper alinement for the member M and the bearings to be worked, and it has been fully demonstrated in practice that the structure herein embodied provides a mechanical device for scraping bearings of babbitt, bronze or the like with a material saving in time and labor, as it has been fully demonstrated in practice that with the present device the three bearings for the crank shaft of an internal combustion engine of the well known Ford type can be fitted within substantially thirty minutes.

From the foregoing description, it is thought to be obvious that a bearing scraper constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A device for scraping the bearings for the crank shaft of an internal combustion engine comprising, in combination with the engine block, an elongated scraping member provided with peripheral cutting teeth, a block adapted for detachable connection with the engine block, and a presser rod threaded through the block and coacting with an end of the member, whereby said member is forced through the bearings upon rotation of the presser rod in one direction.

2. A device for scraping the bearings for the crank shaft of an internal combustion engine comprising, in combination with the engine block, an elongated scraping member provided with peripheral cutting teeth, a block adapted for detachable connection with the engine block, and a presser rod threaded through the block and coacting with an end of the member, whereby said member is forced through the bearings upon rotation of the presser rod in one direction, the working end of the presser rod being conical, the coacting end of the member being provided with a center recess to receive the conical end of the presser rod.

In testimony whereof I hereunto affix my signature in the presence of two witnesses.

MASTON A. BURCH.

Witnesses:
CHAS H. BEDWELL,
TELLA C. HAINES.